A. L. PUTNAM.
DEMOUNTABLE WHEEL.
APPLICATION FILED AUG. 26, 1916.

1,253,420.

Patented Jan. 15, 1918.

Inventor
Alden L. Putnam

By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

DEMOUNTABLE WHEEL.

1,253,420.     Specification of Letters Patent.     Patented Jan. 15, 1918.

Application filed August 26, 1916. Serial No. 116,997.

*To all whom it may concern:*

Be it known that I, ALDEN L. PUTNAM, a citizen of the United States of America, residing at Detroit, in the county of Wayne and State of Michigan, have invented certain new and useful Improvements in Demountable Wheels, of which the following is a specification, reference being had therein to the accompanying drawings.

The invention relates to demountable wheels of that type in which the wheel body is detachably secured to the hub to permit of quick replacement. More particularly the invention relates to a construction in which the body of the wheel is formed of a metal disk having a rim at its periphery for engaging the tire either directly or through the medium of a demountable rim.

Heretofore wheels of this character have been formed attached to the wheel hub by clamping flanges arranged upon opposite sides of the body disk. The driving torque is transmitted through the medium of a series of pins projecting from one of the hub flanges and engaging registering apertures in the body disk. It has, however, been found inconvenient to replace a wheel of this construction, for the reason that it is difficult to hold the disk in engagement with the short pins while the clamping flange is being engaged with the hub and tightened. To overcome this difficulty I have devised an improved construction, in which the pins transmitting the torque are made considerably longer than the thickness of the apertured disk with which they are engaged, and to provide for this increased length the clamping flange is recessed to receive the projecting ends. Furthermore, this recess is utilized for the location of a latching or retaining device for preventing the accidental disengagement of the clamping flange.

Figure 1:
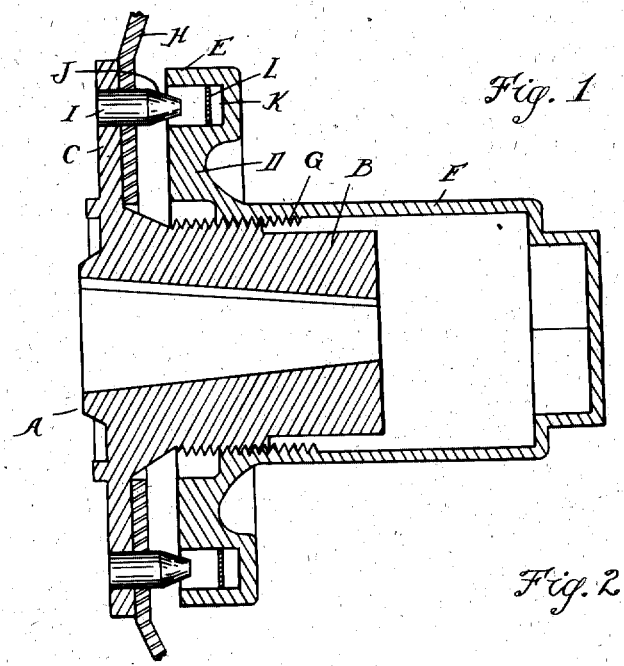
Figure 1 is a section showing the hub and the portion of a wheel to which my improvements are applied.
Figure 2:
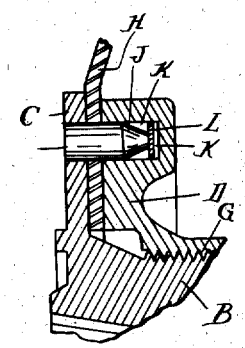
Fig. 2 is a similar view with the parts in clamped position.
Figure 3:
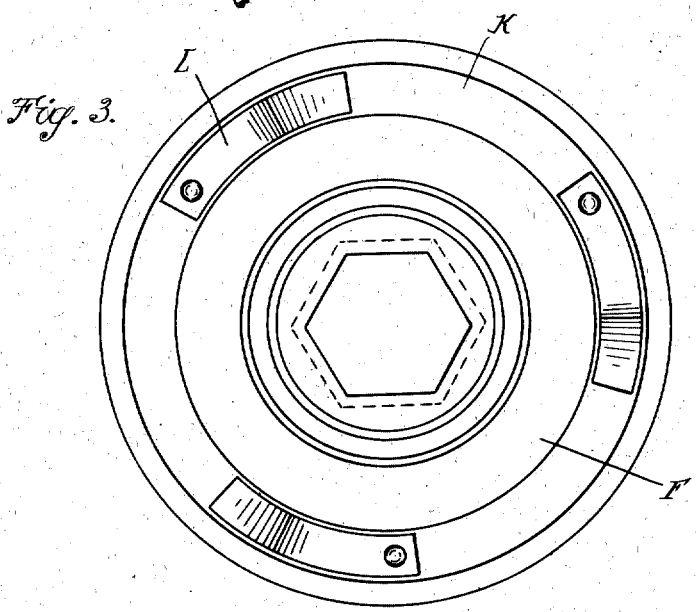
Fig. 3 is an elevation of the clamping flange detached, showing the retaining devices therefor.
Figure 4:
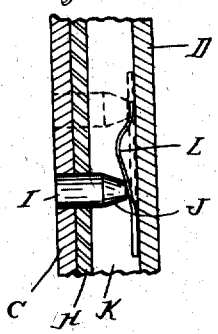
Fig. 4 is a sectional detail view of spring means for preventing accidental unscrewing of two clamping members.

A is the hub to which the demountable wheel is attached, said hub being provided with a body portion B and a flange portion C. D is the clamping member, which has a flange E for coöperating with the flange C, and a hub cap portion F threaded at G to engage a correspondingly threaded portion on the portion B. H is the disk body, which is clamped between the flanges C and E, and I are the driving pins which are secured to and project laterally from the flange E and engage registering apertures in the member H.

As has been stated, where the pins I are restricted in length to the thickness of the disk, it is difficult to engage the latter therewith and hold it in place during the clamping operation. I have therefore formed the pins I of considerably greater length than the thickness of the disk and have tapered their outer ends as indicated at J, so that they may be readily engaged with the apertures in the disk H. The flange E, I have also formed with a recess K for receiving the projecting end of each pin, said recess being preferably of annular form. Thus in mounting the wheel, after the disk H is slipped on the hub and engaged with the pins I the member D may be placed in position and secured by screwing the threaded portion G upon the correspondingly-threaded hub B. During this operation the wheel is held from tipping over, as the pins I are of sufficient length to prevent such a result. On the other hand, these pins do not in any way interfere with the clamping of the disk, as the recess K provides clearance for the projecting ends.

When the wheel is in use, there is a tendency for the vibration of the parts to cause the loosening and unscrewing of the clamping flange. To prevent this, I have arranged retainers in the recess K, preferably curved springs L, which as the flange is tightened will yieldably press against and ride over the pins I. These retainers will not interfere with either the engagement or disengagement of the flange when sufficient force is applied thereto, but will prevent the accidental disengagement due to jar or vibration.

What I claim as my invention is:

1. In a demountable wheel, the combination with a disk body, of a hub having a flange forming a seat for one side of said disk, a series of pins projecting from said flange for engaging registering apertures in said disk, the length of said pins being greater than the thickness of the disk, a clamping disk for engaging the opposite side of said disk having a threaded engagement with said hub and an annular recess therein for receiving the projecting ends of said pin, and retaining means for preventing the accidental unscrewing of the flange located in said annular recess and coöperating with said pins.

2. In a demountable wheel, the combination with a disk body, of a hub having a flange forming a seat for one side of said disk, a series of pins projecting from said flange and engageable with registering apertures in said disk, said pins being of greater length than the thickness of the disk, a clamping flange for the opposite side of said disk having a threaded engagement with said hub and provided with an annular recess for receiving the projecting portions of said pins, and a resilient retainer located in said recess adapted to ride over the ends of said pins and to yieldably engage the same for preventing accidental unscrewing of the disk.

3. In a demountable wheel, the combination with a disk body, of a hub having a flange forming a seat for one side of said disk, a clamping flange for engaging the opposite side of said disk, a pin projecting laterally from one of said flanges engaging a registering aperture in said disk, said pin being of greater length than the thickness of the disk and the projecting portion engaging a recess in the coöperating flange, and retaining means for preventing the accidental unscrewing of the flange located in said annular recess and coöperating with said pin.

In testimony whereof I affix my signature.

ALDEN L. PUTNAM.